(12) United States Patent
Omi et al.

(10) Patent No.: US 9,007,608 B2
(45) Date of Patent: Apr. 14, 2015

(54) IMAGE PROCESSING APPARATUS AND METHOD FOR THREE-DIMENSIONAL OBJECTS

(71) Applicants: Taisuke Omi, Kanagawa (JP); Masaaki Kawamura, Kanagawa (JP); Kazuo Koike, Kanagawa (JP); Kenichi Yamada, Kanagawa (JP); Tasuku Kohara, Kanagawa (JP); Tsuyoshi Endoh, Kanagawa (JP); Hiroshi Takeda, Chiba (JP)

(72) Inventors: Taisuke Omi, Kanagawa (JP); Masaaki Kawamura, Kanagawa (JP); Kazuo Koike, Kanagawa (JP); Kenichi Yamada, Kanagawa (JP); Tasuku Kohara, Kanagawa (JP); Tsuyoshi Endoh, Kanagawa (JP); Hiroshi Takeda, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 29 days.

(21) Appl. No.: 13/892,430

(22) Filed: May 13, 2013

(65) Prior Publication Data

US 2013/0314731 A1     Nov. 28, 2013

(30) Foreign Application Priority Data

May 24, 2012   (JP) ................................ 2012-118334

(51) Int. Cl.
| | |
|---|---|
| *G06F 3/12* | (2006.01) |
| *H04N 1/04* | (2006.01) |
| *G06K 15/00* | (2006.01) |
| *H04N 1/00* | (2006.01) |
| *H04N 1/23* | (2006.01) |

(52) U.S. Cl.
CPC ....... *H04N 1/00278* (2013.01); *H04N 1/00251* (2013.01); *H04N 1/23* (2013.01); *H04N 1/00347* (2013.01); *H04N 2201/0063* (2013.01); *H04N 2201/0084* (2013.01); *H04N 2201/0091* (2013.01)

(58) Field of Classification Search
USPC ......................................... 358/1.13
See application file for complete search history.

(56) References Cited

U.S. PATENT DOCUMENTS

| | | | |
|---|---|---|---|
| 5,640,467 A | 6/1997 | Yamashita et al. | |
| 5,894,529 A * | 4/1999 | Ting | ............................... 382/312 |
| 5,898,508 A * | 4/1999 | Bekanich | ....................... 358/474 |
| 8,451,511 B2 * | 5/2013 | Haendler et al. | ............... 358/474 |
| 2001/0012411 A1 | 8/2001 | Miyazaki et al. | |
| 2002/0030853 A1 | 3/2002 | Kizaki et al. | |

(Continued)

FOREIGN PATENT DOCUMENTS

| | | |
|---|---|---|
| JP | 59-224971 | 12/1984 |
| JP | 2003-186126 | 7/2003 |
| JP | 2005-024971 | 1/2005 |

*Primary Examiner* — Benny Q Tieu
*Assistant Examiner* — Sunil Chacko
(74) *Attorney, Agent, or Firm* — Harness, Dickey & Pierce P.L.C.

(57) ABSTRACT

An image processing apparatus includes an exposure glass on which an original is to be placed; a scanner cover to openably cover the exposure glass from above, a tip of the scanner cover is lifted to open the exposure glass; a document scanner to read a two-dimensional objet of the original on the exposure glass and output read image data; a camera unit to capture an image of a three-dimensional object of the original on the exposure glass and output captured image data; photography lighting equipment including movable light source unit to illuminate the three-dimensional object put when the camera unit captures the image of the three-dimensional object; an image forming unit to convert the read image data and the captured image data to form a printed image on a recording medium; and a setting controller to control a reading process, a capturing process, and an image forming process.

10 Claims, 12 Drawing Sheets

(56) References Cited

U.S. PATENT DOCUMENTS

| | | |
|---|---|---|
| 2006/0279780 A1* | 12/2006 | Anno et al. ............ 358/1.15 |
| 2007/0212101 A1 | 9/2007 | Koike et al. |
| 2008/0307329 A1 | 12/2008 | Endoh |
| 2009/0122563 A1* | 5/2009 | Ko et al. ............ 362/418 |
| 2009/0237692 A1 | 9/2009 | Endoh et al. |
| 2009/0300529 A1 | 12/2009 | Endoh et al. |
| 2009/0316193 A1 | 12/2009 | Kohara et al. |
| 2009/0316954 A1 | 12/2009 | Kohara et al. |

* cited by examiner

IMAGE PROCESSING APPARATUS AND METHOD FOR THREE-DIMENSIONAL OBJECTS

CROSS-REFERENCE TO RELATED APPLICATION

This patent application is based on and claims priority pursuant to 35 U.S.C. §119 to Japanese Patent Application No. 2012-118334, filed on May 24, 2012 in the Japan Patent Office, the entire disclosure of which is hereby incorporated by reference herein.

BACKGROUND

1. Technical Field

The present disclosure relates to an image processing device and an image processing method executed by the image processing device, and more specifically, an image processing device to copy a three-dimensional object placed on an exposure glass.

2. Related Art

In general, electrophotographic image forming apparatuses (image processing apparatus), such as copiers, printers, facsimile machines, or multifunction devices including at least two of those functions, etc., include a latent image carrier on which an electrostatic latent image is formed, a development device to develop the latent image with developer, a transfer device to transfer the developed image onto a sheet of recording media (typically but not always paper) to bear the image, and a fixing device to fix the transferred toner image on the recording paper.

In addition to a general function to copy a two-dimensional document by putting the document on an exposure glass and converting by a predetermined multiple to scale any size to output a copy, market further demands for stereoscopically making a copy of duplicating three-dimensional objects (e.g., a PET bottle, etc.) to the recording paper so as to describe merchandise.

For example, in JP-S59-224971-A, a three-dimensional object is read by illuminating the three-dimensional object from a thin light screen formed by a light-emitting unit including multiple optical sources and optical devices, receiving a reflected light from the three-dimensional object by a light-reading unit including a charge-coupled device (CCD) that receives a reflected light from the three-dimensional object, and moving the light-emitting unit and the light-reading unit relative to the three-dimensional object in a direction orthogonal to the object. Then, the light-reading unit converts image signals into electrical signals for output suitable to a printer unit, and a printer unit forms an image in accordance with the output signal.

In addition, JP-2003-186126-A proposes a three-dimensional object import device that includes a scanner, a three-dimensional object lighting equipment, a three-dimensional object moving device with a scale, a three-dimensional object moving glass plate, a three-dimensional object fixed glass plate, and a scanner lens position adjustment device with a scale.

However, in the above-described copying method, even when the three-dimensional object is placed on the exposure glass, the copying output cannot be acquired with a high degree of accuracy because the image processing apparatus is set up for a two-dimensional object (in terms of print position object field depth and lighting method, etc.). In addition, for example, in the technique as proposed in the above-mentioned example, reading the reflection light is required, and it is necessary to position the optical elements (scanner and CCD) in a dark place, and there is a serious limitation in use.

Alternatively, in a technique proposed in JP-2003-186126-A, although a three-dimensional object reading device (fixture with scale) is provided, it is necessary to move both the scanner and the three-dimensional object when reading the three-dimensional object, which is a complicated operation.

By contrast, with the onset of digital cameras, the three-dimensional object is captured by the digital camera and the captured image is input to an information processor (i.e., a personal computer), thereby enabling the printing paper to be output with a desired size, using the printer as the image processing apparatus. This capturing method enables the three-dimensional object to be printed and output. However, setting optimal lighting conditions for capturing suitably is dependent on the photographer, and therefore, setting optimal lighting conditions may be difficult.

In order to solve this problem, for example, JP-2005-024971-A proposes an image capturing system that includes photography lighting equipment that can change lighting conditions to illuminate at least one part of the object, an imaging unit to acquire the image information of the object, a lighting determination unit to analyze the lighting condition of the object based on the image information acquired by the imaging unit, and a lighting equipment controller to control the photography lighting equipment based on the determination result of the lighting determination unit.

However, in the capturing system, when the three-dimensional object is captured for outputting, in addition to the image processing apparatus, the digital camera and an information processing device are required. Therefore, many processes are required, compared to the printing from the two-dimensional object, and a long time is required. In addition, in order to reduce fluctuation in illumination of the object and provide uniform intensity of light in this capturing system, a large capturing area, a quantity of photography lighting equipment, and a complicated image determination system are required. Therefore, using this system for capturing an object on the exposure glass may be impractical.

SUMMARY

In one exemplary embodiment of the present disclosure, there is provided an image processing apparatus including an exposure glass, a scanner cover, a document scanner, a camera unit, photography lighting equipment, an image forming unit, and a setting controller. An original is to be placed on the exposure glass. The scanner cover openably covers the exposure glass from above, and a tip of the scanner cover is lifted around a first side face of the exposure glass to open the exposure glass. The document scanner reads a two-dimensional object of the original on the exposure glass and outputs the read image data. The camera unit, disposed near a second side face positioned opposite to the first side face of the exposure glass, captures an image of a three-dimensional object of the original on the exposure glass and output the captured image data. The photography lighting equipment, including a movable light source unit, illuminates the three-dimensional object put on the exposure glass when the camera unit captures the three-dimensional object. The image forming unit converts the read image data and the captured image data to form a printed image on a recording medium. The setting adjuster sets the reading process in the document scanner, the capturing process in the camera unit, and the image forming process in the image forming unit.

In another aspect of present disclosure, there is a provide an image processing method executed by an image processing apparatus that includes an exposure glass on which an original is to be placed; a scanner cover to openably cover the exposure glass from above, a first side face of the scanner cover is lifted to open the exposure glass; a document scanner to read a two-dimensional object of the original on the exposure glass and output the read image data. The method including the steps of: opening the scanner cover lifted to open the exposure glass; putting a three-dimensional object of the original on the exposure glass; illuminating the three-dimensional object put on the exposure glass; controlling a shooting environment; capturing an image of the three-dimensional object on the exposure glass; and converting captured image data to form a printed image on a recording medium to output a copy.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
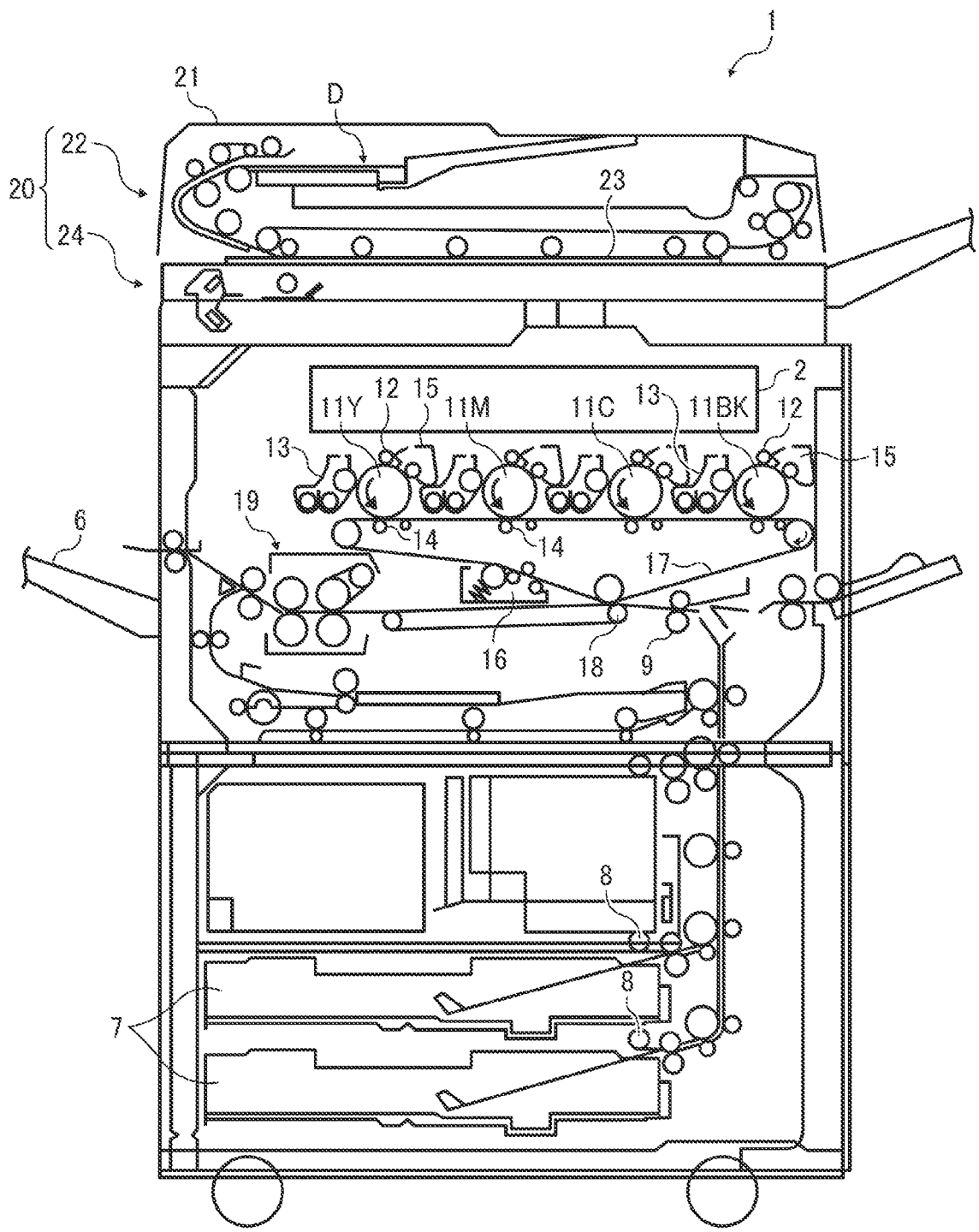
FIG. 1 is a schematic diagram illustrating a configuration of an image processing apparatus according to the present disclosure.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result. Referring now to the drawings, wherein like reference numerals designate identical or corresponding parts throughout the several views thereof, and particularly to FIG. 9, a multicolor image processing apparatus according to an illustrative embodiment of the present invention is described.

FIG. 1 is a schematic diagram illustrating a configuration of a tandem multicolor image processing apparatus 1. It is to be noted that the subscripts Y, M, C, and BK attached to the end of each reference numeral indicate only that components indicated thereby are used for forming yellow, magenta, cyan, and black images, respectively, and hereinafter may be omitted when color discrimination is not necessary.

The image processing device 1 includes an exposure glass 23 on which an original is to be placed; a scanner cover 21 to openably cover the exposure glass 23 from above, whose one face is lifted to expose the exposure glass 23; a scanner unit 20 to read a two-dimensional object of the original on the exposure glass 23 and output the read image data; a camera unit 33 to capture a three-dimensional object 35 of the original on the exposure glass 22 and output the captured image data; photography lighting equipment 40 to illuminate the three-dimensional object 35 put on the exposure glass 23 when the camera unit 33 captures the three-dimensional object 35; an image forming unit 10 to form the document data and the captured image data to the output as a printed image; and a setting controller to set the reading process in the scanner unit 20, the capturing process in the camera unit 33, and the image forming process in the image forming unit 10.

It is to be noted that, in the present disclosure, outputting the copying sheet means outputting various scales of copying sheet having a scale in which the size of the object (document, three-dimensional object) at same magnification or expansion and reduced scaled copy at arbitrarily magnification. In addition, as for the same size printing, based on processing method types of the image processing device, the magnification is different in a main scanning direction and a sub-scanning direction, or X-direction and Y-direction, which is contained in the printed output at the same scale.

(Entire Configuration of Image Processing Apparatus)

FIG. 1 is a schematic diagram illustrating a configuration of a tandem multicolor image processing apparatus 1. In FIG. 1, reference number 2 represents a writing unit to emit laser beams according to image data, 6 represents a sheet discharge tray on which sheets P of recording media after image is formed is discharged, 7 represents a sheet cassette containing the sheets P of recording media, 8 represents feed rollers, 9 represents a pair of registration rollers to adjust the timing to transport the sheet P, 11 represents photoconductor drums serving as image carriers on which yellow, magenta, cyan, and black toner images are formed, respectively, 12 represents charging members to charge surfaces of the respective photoconductor drums 11, 13 represents development devices to develop electrostatic latent images formed on the respective photoconductor drums 11, 14 represents primary-transfer bias rollers to transfer toner images formed on the respective photoconductor drums 11 onto an intermediate transfer belt 17, and 15 represents cleaning units to clean the surfaces of the respective photoconductor drums 11.

Additionally, reference number 16 represents a belt cleaning unit to clean a surfaces of the intermediate transfer belt 17, 18 represents a secondary-transfer bias roller to transfer the toner image from the intermediate transfer belt 17 onto the sheet P, and 19 represents a fixing device to fix the toner image on the sheet P. Furthermore, toner containers 28 (shown in FIG. 2) respectively containing yellow, cyan, magenta, and black toilers to be supplied to the respective development devices 13 are provided above the photoconductors 11 although not shown in FIG. 1.

In addition, reference numeral 20 represents a scanner unit to read the image information of the document D. The scanner unit 20 includes an automatic document feeder (ADF) 22, an exposure glass 23, and a document scanner 24. The ADF 22 is provided in the scanner cover 21. The two-dimensional object D or a three-dimensional object 35 is placed on the exposure glass 23. The document scanner 24 reads the image on the document D placed on the exposure glass 23 for outputting the read image data to the printing unit 10.

Figure 2:
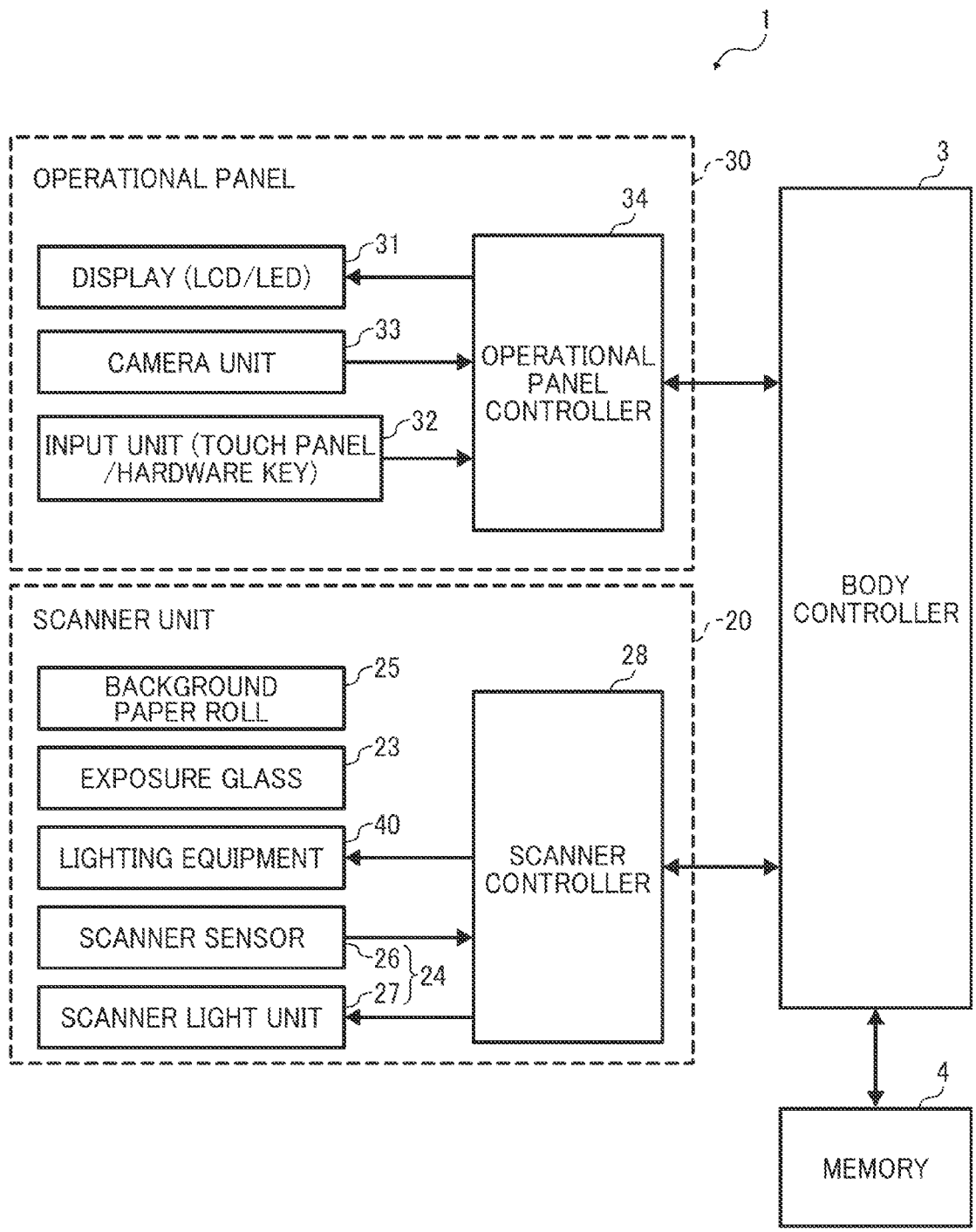
FIG. 2 is a functional block diagram related to copying operation to copy the three-dimensional object in the image processing apparatus shown in FIG. 1.

Operations of the image processing apparatus 1 shown in FIG. 1 to form multicolor images are described below. It is to be noted that FIG. 2 is also referred to when image forming process performed on the respective photoconductor drums 11 are described.

In the document feeder 20, transport rollers, not shown, transport original documents D set on a document table 22, in a direction indicated by an arrow onto an exposure glass 23 of the document scanner 24. Then, the document scanner 24 reads image data of the original document D set on the exposure glass 23 optically.

More specifically, the document scanner 24 scans the image in the original document D with light emitted from a scanner lamp 27. The light reflected by a surface of the original document D is imaged on a color sensor via mirrors and lenses, not shown. The color sensor reads the multicolor image data of the original document D for each decomposed colors of red, green, and blue (RGB) and convert the image data into electrical image signals. Further, the image signals are transmitted to an image processor, not shown, that performs image processing (e.g., color conversion, color calibration, and spatial frequency adjustment) according to the image signals, and thus image data of yellow, magenta, cyan, and black is obtained.

The yellow, magenta, cyan, and black single-color image data is then transmitted to the writing unit 2, and the writing unit 2 directs laser beams L (shown in FIG. 2) corresponding to the single-color image data to the respective photoconductor drums 11.

Meanwhile, the four photoconductor drums 11 rotate clockwise in FIG. 1. Initially, the surface of each photoconductor drum 11 is charged uniformly by the charging member 12 at a position facing the charging member 12 to a predetermined or given charge electrical potential, which is referred to as a charging process. When the surface of the photoconductor drums 11 reach positions to receive the laser beams L, respectively, the writing unit 2 directs the laser beams L according to the respective color image date, emitted from four light sources (not shown), to the respective photoconductor drums 11, which is referred to as an exposure process. The four laser beams L pass through different optical paths for yellow, magenta cyan, and black.

The laser beam L corresponding to the yellow component is directed to the photoconductor drum 11Y, which is the first from the left in FIG. 1 among the four photoconductor drums 11. A polygon mirror, not shown, that rotates at high velocity deflects the laser beam L for yellow in a direction of a rotation axis of the photoconductor drum 11Y (main scanning direction) so that the leaser beam L scans the surface of the photoconductor drum 11Y. Thus, an electrostatic latent image for yellow is formed on the photoconductor drum 11 charged by the charging member 12.

Similarly, the laser beam L corresponding to the magenta component is directed to the surface of the photoconductor drum 11M, which is the second from the left in FIG. 1. The laser beam L corresponding to the cyan component is directed to the surface of the photoconductor drum 11C, which is the third from the left in FIG. 1. The laser beam L corresponding to the black component is directed to the surface of the photoconductor drum 11BK that is the fourth from the left in FIG. 1. Thus, electrostatic latent images for magenta, cyan, and black are formed on the photoconductor drum 11M, 11C, and 11BK, respectively.

Then, each photoconductor drum 11 reaches a position facing the development device 13, and the development device 13 supplies toner of the corresponding color to the photoconductor drum 11. Thus, the latent images on the respective photoconductor drums 11 are developed into different single-color toner images in a development process.

Then, each photoconductor drum 11 reaches a position facing the intermediate transfer belt 17 where the primary transfer roller 14 is disposed in contact with an inner circumferential surface of the intermediate transfer belt 17. At these positions, the toner images formed on the respective photoconductor drums 11 are sequentially transferred and superimposed one on another on the intermediate transfer belt 17, forming a multicolor toner image thereon, in a primary transfer process. After the primary transfer process, the surface of each photoconductor drum 11 reaches a position facing the cleaning unit 15, where the cleaning unit 15 collects any toner remaining on the photoconductor drum 11 in a cleaning process. Additionally, the surface of each photoconductor drum 11 passes through a discharge device, not shown, and thus a sequence of image forming processes performed on each photoconductor drum 11 is completed.

Meanwhile, the intermediate transfer belt 17 carrying the multicolor toner image further rotates clockwise in FIG. 1 to a secondary transfer nip where the secondary-transfer bias roller 18 presses against the intermediate transfer belt 17, and then the multicolor toner image is transferred from the intermediate transfer belt 17 onto the sheet P in a secondary transfer process. After the secondary transfer process, the intermediate transfer belt 17 reaches a position facing the belt cleaning unit 16, where any toner remaining on the intermediate transfer belt 17 is collected by the belt cleaning unit 16. Thus, a sequence of image forming processes performed on the intermediate transfer belt 17 is completed.

Herein, sheets P are transported from one of the sheet cassettes 7 via the registration rollers 9, etc., to the secondary transfer nip formed between the intermediate transfer belt 17 and the secondary-transfer bias roller 18. More specifically, the feed roller 8 sends out the sheet P from the sheet cassette 7, and the sheet P is then guided by a sheet guide, not shown, to the registration rollers 9. The registration rollers 9 forward the sheet P to the secondary transfer nip, timed to coincide with the arrival of the multicolor toner image formed on the intermediate transfer belt 17.

Then, a transport belt, not shown, transports the sheet P to the fixing device 19, and the toner image is fixed on the sheet P in a nip where a fixing belt and a pressure roller, not shown, of the fixing device 19 press against each other. After the fixing process, discharge rollers, not shown, discharge the sheet P as an output image outside the image processing apparatus 1. Thus, a sequence of image forming processes is completed.

(Configuration of Copying Three-Dimensional Object)

FIG. 2 is a functional block diagram related to copying operation to copy the three-dimensional object 35 in the image processing apparatus 1. A system of the image processing apparatus 1 for capturing the three-dimensional object includes an image processing apparatus.

The operational panel 30 is a liquid crystal display (LCD) system or light emitting diode (LED) display system to display various types of information for the user. The operational panel 30 includes a display 31 to display the image data captured by the camera unit 33 and monitor image data while monitoring the image data, an input portion 32 such as a touch panel on the LCD 31 or hardware key that receives the input from the user, a camera unit 33 to capture the three-dimensional object 35 (see FIG. 9) to acquire the monitor image data and captured image data, and an operational panel controller (image analysis unit) 34 to control the operations in the operational controller 30.

In addition, the scanner unit 20 includes a slide-type background screen 25 (background paper roll) contained in the scanner cover 21 or the body of the scanner unit 20, an exposure glass 23 on which the three-dimensional object 35 is placed, photographic lighting equipment 40 positioned on at least two sides (third side face 23-3, 23-4) of the exposure glass 23, the document scanner 24 that includes a scanner sensor 26 to convert the light into the electrical signal when the two-dimensional object D is scanned and a scanner light source unit 27 to emit the light, and a scanner controller (image analyze unit) 28 to control the document scanner 24 and the photographic lighting equipment 40 to emit the body controller 3 in the image processing apparatus 1.

Figure 3:
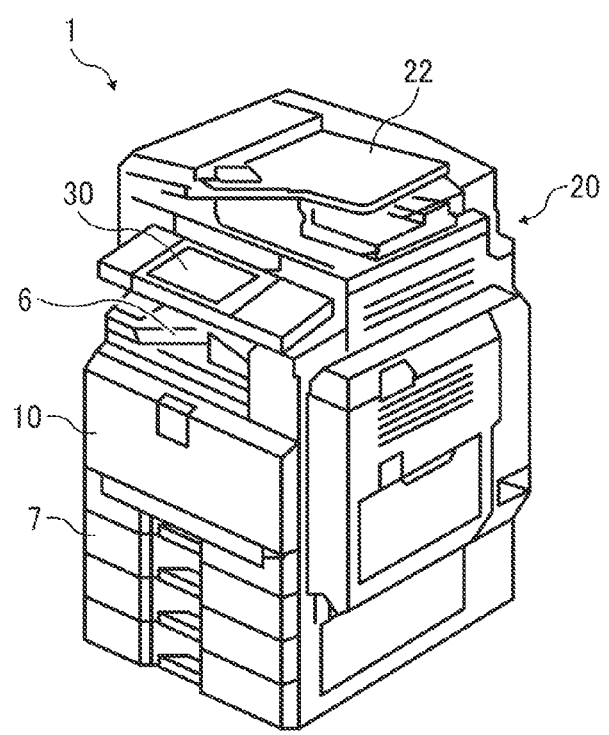
FIG. 3 is a perspective view illustrating one example of exterior of the image processing apparatus.

Next, the operation in the image processing apparatus 1 is described below. FIG. 3 is a perspective view illustrating one example of exterior of the image processing apparatus 1. As illustrated in FIG. 3, the image processing apparatus 1 includes the automatic document feeder (ADP) 22 of the scanner cover 21, the scanner unit 20 including the document scanner 24, the operational panel 30 to enable the operation of the reading, capturing, and image forming operation to a printer unit (image forming unit) 10 to perform printing operation, the sheet discharge tray 6 on which sheets P of recording media after image is formed is discharged, and the sheet feeder 7 to feed the sheets P of recording paper to the printer unit 10. Since FIG. 3 is one variation configuration of the image processing apparatus 1, the position of the discharge tray 6 is different from that shown in FIG. 1.

Figure 4:
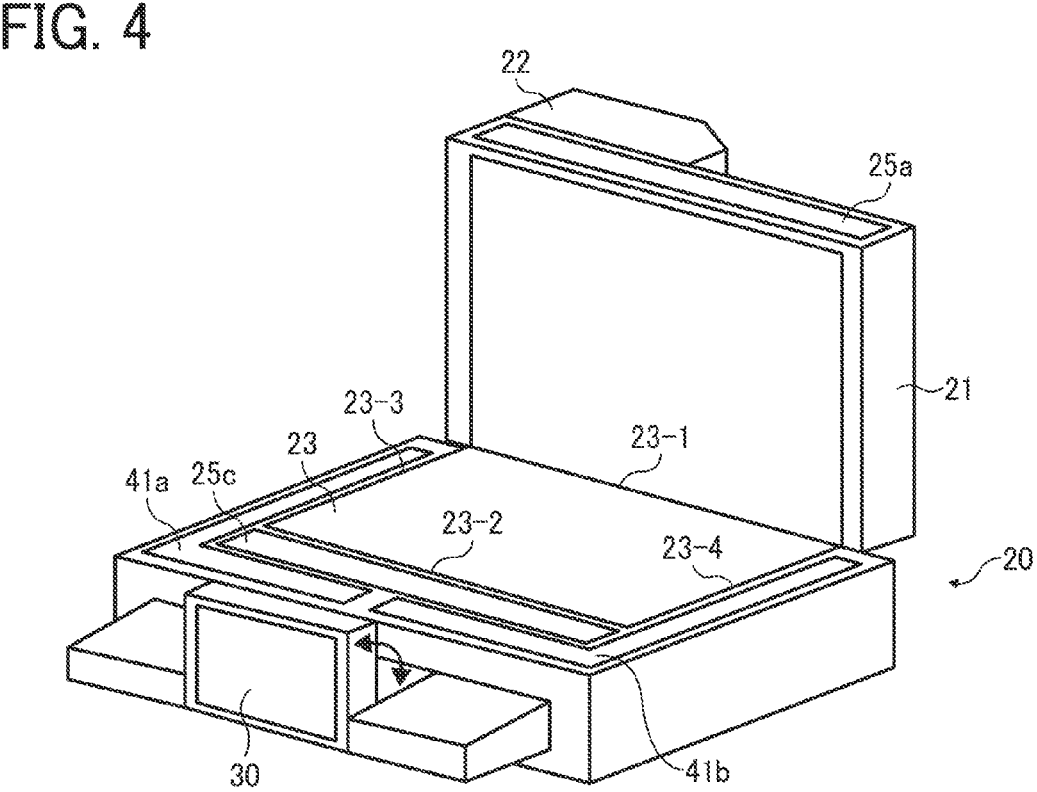
FIG. 4 is a perspective view illustrating a scanner unit when a scanner cover is opened according to a first embodiment.

In the image processing apparatus 1, the scanner cover 21 can open and close the exposure glass 23. In standby state, the scanner cover 21 covers the exposure glass 23. By opening the scanner cover 21, the exposure glass 23 is exposed as shown in FIG. 4. The state shown in FIG. 4 is the state a shooting environment (condition) is being prepared before the three-dimensional object 35 is captured. Herein, although the scanner cover 21 opens from distal side to the proximal side in the present disclosure, the opening direction of the scanner cover 21 is not limited above; for example, the scanner cover 21 can open in a right side direction or left side direction shown in FIG. 4.

First Embodiment

FIG. 4 is a perspective view illustrating the scanner unit 20 when shooting environment is set up before the three-dimensional object 35 is captured according to a first embodiment. In FIG. 4, the scanner unit 20 includes photography lighting equipment 40 to illuminate the three-dimensional object 35 to be placed on the exposure glass 23. In the configuration shown in FIG. 4, the photography lighting equipment 40 includes two light built-in L-shaped arms 41a and 41b positioning along the three sides in the three sides other than a rotary shaft side (first face 23-1 side) of the scanner cover 21. Herein, the light built-in L-shaped arms 41a and 41b and below-described light built-in cruciform arms 43a and 43b of the photography lighting equipment 40 are dimensioned so that the position of the photography lighting equipment 40 (41a, 41b, and 43a, 43b) is equal to or lower than that of the exposure glass 23 when the photography lighting equipment 40 is housed. Accordingly, when the photography lighting equipment 40 is not in use, for example, when the two-dimensional object D is copied, an inner face of the scanner cover 21 can contact and press the two-dimensional object D on the exposure glass 23, and therefore, the copying operation and scanning operation of the two-dimensional object D can be performed without fail of opening and closing the scanner cover 21.

The scanner unit 20 includes the slidable background paper roll 25 to function as a background screen for capturing the three-dimensional object 35. In the first embodiment shown in FIG. 4, the background paper roll 25 is slidably contained in a screen container 25b in a tip of the scanner cover 21. When the three-dimensional object 35 is captured, the background paper roll 25 is pulled out so that the background paper roll 25 is positioned between an upper tip of the scanner cover 21 and a second side face 23-2 of the exposure glass 23, positioned opposite to the first side face 23-1 passing through the vicinity of the rotary shaft of the scanner cover 21 (see FIG. 7).

Figure 5:
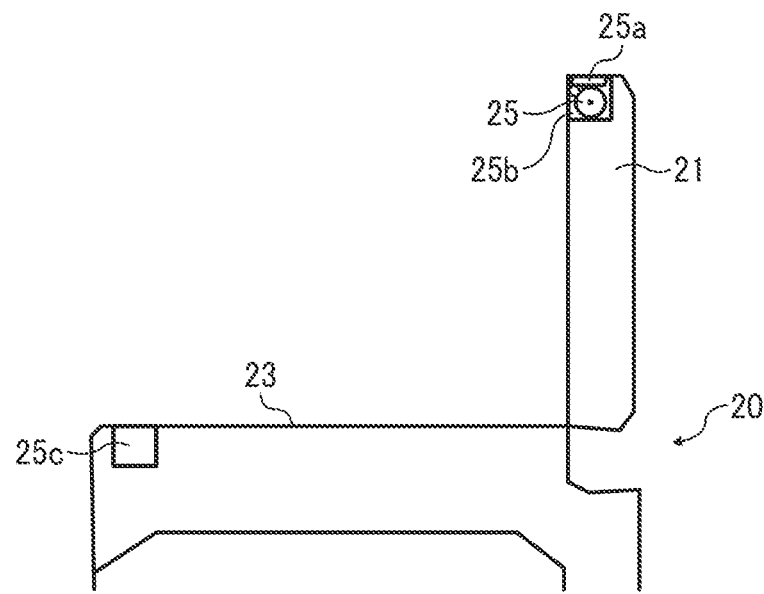
FIG. 5 is a side view illustrating the scanner unit shown in FIG. 4 in a state in which a background paper roll is contained in the scanner cover.
Figure 6:
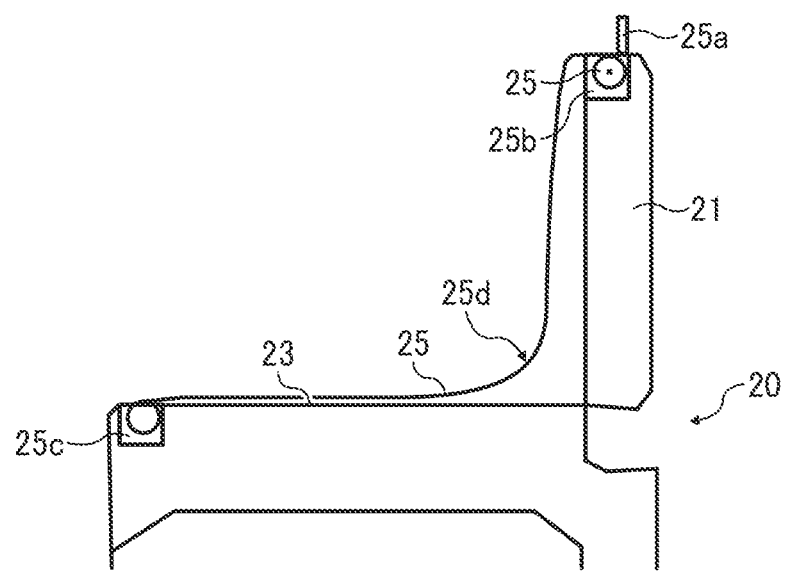
FIG. 6 is a side view illustrating the scanner unit shown in FIG. 4 in a state in which the background paper roll is pulled out and the fixed at the front side of the exposure glass.

FIGS. 5 and 6 are side views of FIG. 4. FIG. 5 is a side view illustrating the scanner unit 20 in a state in which the background paper roll 25 is contained in the scanner cover 21. FIG. 6 is a side view illustrating the scanner unit 20 in a state in which the background paper roll 25 is pulled out and is fixed at the front side (second face 23-2 side) of the exposure glass 23.

As illustrated in FIG. 5, the scanner cover 21 includes the screen container 25b to contain the background paper roll 25. In addition, a container cover 25a that can open the screen container 25b is provided on a front surface of the screen container 25b. In standby state, the background paper roll 25 is contained in the screen container 25b in the scanner cover 21 in a state in which the screens of the background paper roll 25 are reeled in. When the background paper roll 25 is in use, the container cover 25a is opened and the screen of the background paper roll 25 is draped and to cover the entire exposure glass 23. Herein, the background paper roll 25 can be fixed by reeling in a screen fixing member 25c positioned on the operational panel 30 side (second side face 23-2 side) in a state in which the screen of the background paper roll 25 is draped. The screen fixed member 25c is provided between the exposure glass 23 and the light built-in L-shaped arms 41a and 41b.

Herein, it is preferable that the background paper roll 25 be screens made by continuously connecting background-design, background-color, and combination thereof. For example, by connecting dozens of types of background-design and background-color continuously, the user can select a desired background design and background color screen from the screens of the background paper roll 25 while the user pulls out and reels in the background paper roll 25, and then the background paper roll 25 is fixed so that the desired background-design and background-color screen can be positioned in front of the inner face of the scanner cover 21 and over the exposure glass 23.

In addition, it is preferable that, the background paper roll 25 be set at a predetermined bending ratio as indicated by arrow 25d in shown in FIG. 6 so as to prevent the generation of extra shade in the background of the three-dimensional object 35 caused by bending the screen.

Figure 7:
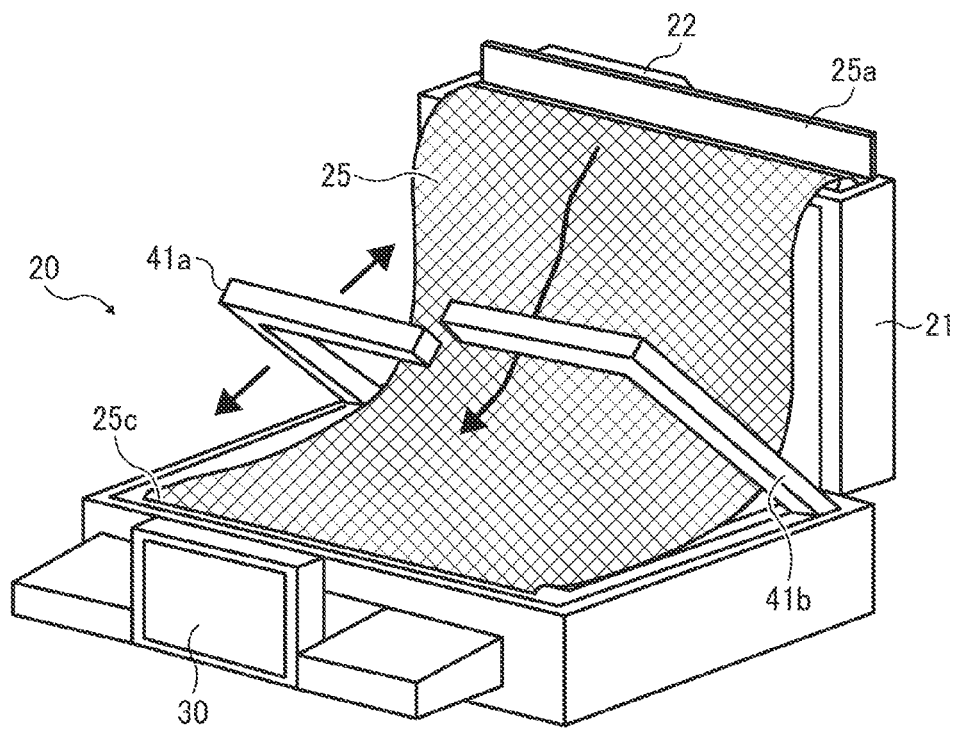
FIG. 7 is a perspective view illustrating the scanner unit shown in FIG. 4 after light built-in L-shaped arms are stand after setting of the background paper roll is finished after the state shown in FIG. 6.

Furthermore, as illustrated in FIG. 7, after the position the background paper roll 25 is fixed so that the desired background-design and background-color screen covers in front of the inner face of the scanner cover 21, the light built-in L-shaped arms 41a and 41b are stood. The light built-in L-shaped arms 41a and 41b is stood (pivoted) from the contained state while one end (the scanner cover 21 side) of the light built-in L-shaped arms 41a and 41.b are fixed, and then area held at a given height from the exposure glass 23.

Figure 8:
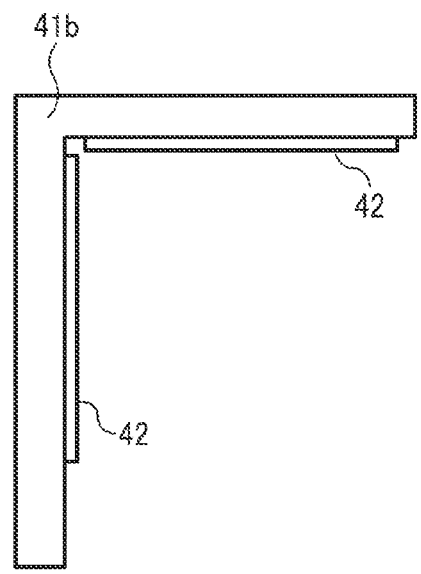
FIG. 8 is a top view illustrating one of light built-in L-shaped arms shown in FIG. 7.

As illustrated in FIG. 8, each of the light built-in L-shaped arms 41 and 41b has two light source sticks 42 positioned inner side faces of the L-shaped arms. The light sources (light source units) 42 are controlled by the scanner controller 28. The various control, such as, how much the amount of light should be set or which one or more of light source should be emitted can be set by using the operational panel 30 by the user.

As described above, in the light built-in L-shaped arms 41a and 41b, the light source units 42 are provided at the desired position, and the amount of light and the position of light emission can be adjusted, suitable shooting environment can be set up.

In addition, the operational panel 30 can be stand-ably contained in the body of the image forming unit 10. More specifically, when the three-dimensional object 35 is captured one end of the operational panel 30 on the exposure glass 23 side is stood. The LCD 31 and input portion 32 are positioned on an upper side of the operational panel 30 when the operational panel 30 is contained. On the opposite side (lower side when the operational panel 30 is contained) of the LCD 31 and input portion 32), the camera unit 33 that can capture the three-dimensional object 35 put on the background paper roll 25 is provided. Furthermore, as illustrated in FIG. 9, the camera unit 33 includes an adjuster that can adjust the height of the camera unit 33, thereby capturing the three-dimensional target 35 at a desired height so that the camera unit 33 can face the three-dimensional object 35 positioned in front of an inner side of the scanner cover 21.

Figure 9:
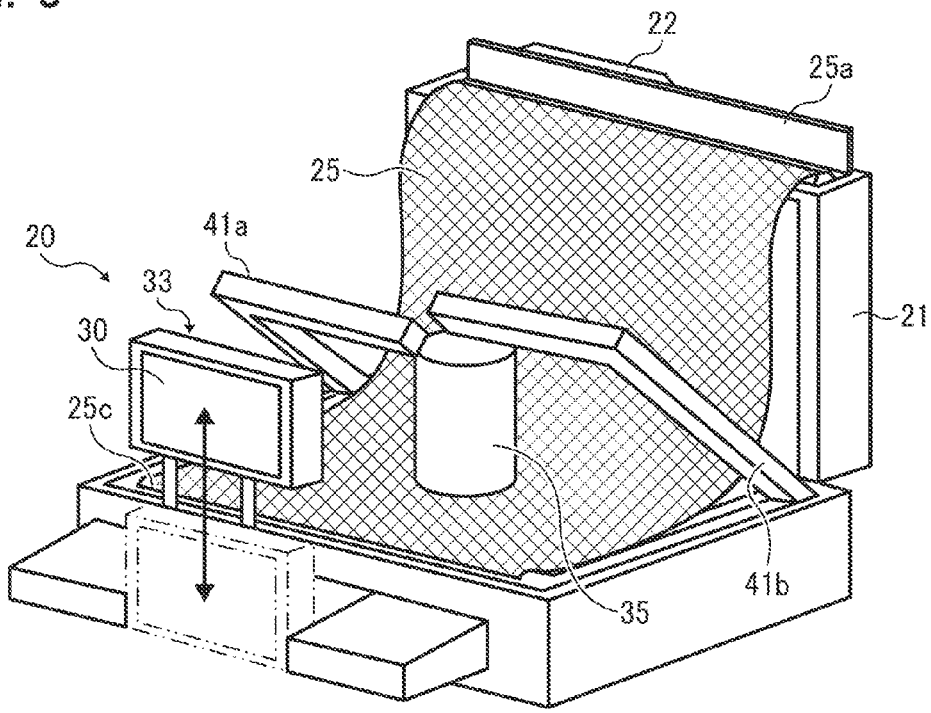
FIG. 9 is a perspective view illustrating the scanner unit after capturing setting is finished after the state shown in FIG. 7.

The configuration of the camera unit 33 is not limited to that like shown in FIG. 9. For example, a camera unit in a digital still camera and a small camera unit installed in mobile phone or a personal computer can be used for the camera unit 33.

In addition, although the camera unit 33 is installed in the operational panel 33 in the present embodiment, the configuration of the camera unit 33 is not limited above; for example, the camera unit 33 can be independently provided from the operational panel 30.

After setting up the shooting environment (lighting environment and setting position), the three-dimensional object 35 put on the exposure glass 23 via the background paper roll 25 is captured using the camera unit 33. Then, the captured image data is output to the printer unit 10, and then is output as a copy from the printer unit 10. It is to be noted that, the setting sequence of shooting environment is not limited above.

Second Embodiment

Figure 10:
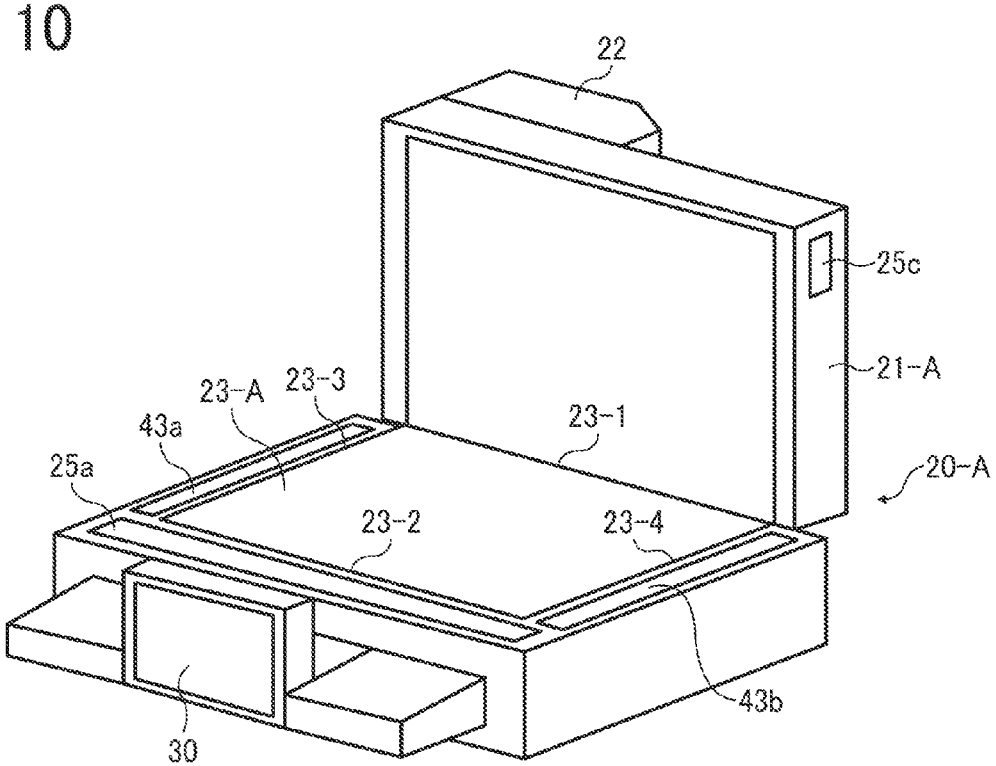
FIG. 10 is a perspective view illustrating the scanner unit when a scanner cover is opened according to a second embodiment.
Figure 11:
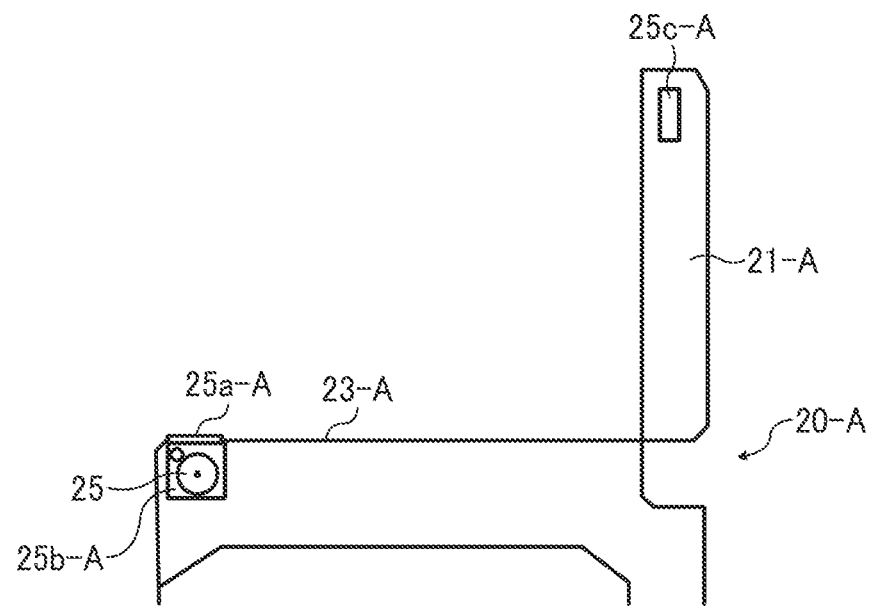
FIG. 11 is a side view illustrating the scanner unit shown in FIG. 10 in a state in which a background paper roll is contained on an exposure glass side.
Figure 12:
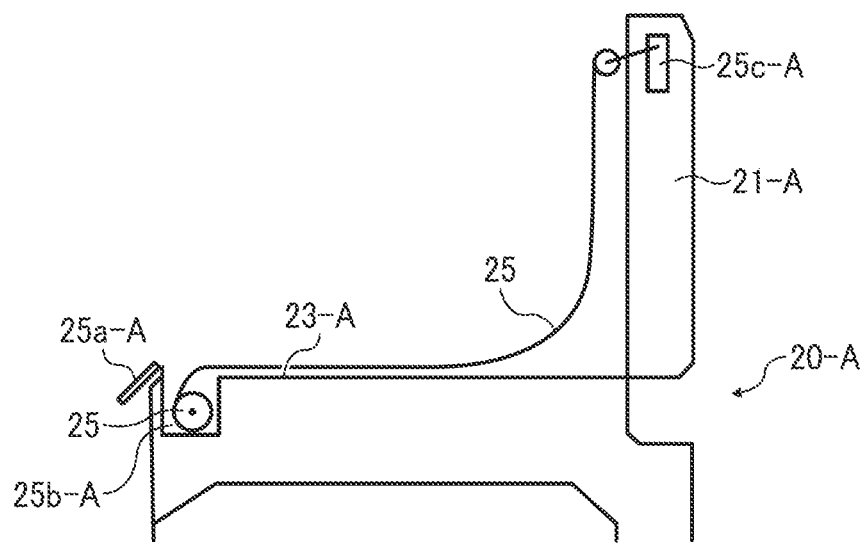
FIG. 12 is a side view illustrating the scanner unit shown in FIG. 10 in a state in which the background paper roll is pulled out and the fixed at the front side of the exposure glass.

Next, a second embodiment of a scanner unit 20-A is described below with reference to FIGS. 10 through 14. FIG. 10 is a perspective view illustrating the scanner unit 20-A when shooting environment is set up before the three-dimensional object 35 is captured according to the second embodiment. FIGS. 11 and 12 are side views of FIG. 10. FIG. 11 is a side view illustrating the scanner unit 20-A in a state in which the background paper roll 25 is contained on the exposure glass 23 side. FIG. 12 is a side view illustrating the scanner unit 20-A in a state in which the background paper roll 25 is pulled out from the exposure glass 23 side and the fixed at the upper tip of the scanner cover 21.

As illustrated in FIG. 11, the scanner unit 20-A includes a screen container 25b-A to contain the background paper roll 25 on the exposure glass 23 side. In addition, a container cover 25a that can open the screen container 25b-A is provided on the front surface of the screen container 25b. In standby state, the background paper roll 25 is contained in the screen container 25b-A in the scanner unit 20-A near the second side face 23-2 of the exposure glass 23 in a state in which the screens of the background paper roll 25 are reeled in. When the background paper roll 25 is in use, the container cover 25a-A is opened and the background paper roll 25 is pulled up to cover the entire exposure glass 23 and the inner face of scanner cover 21-A. Herein, the background paper roll 25 can be fixed by reeling in a screen fixing member 25c-A positioned in the scanner cover 21A in a state in which the screen of background paper roll 25 is pulled out.

The scanner unit 20 includes the photography lighting equipment 40 to illuminate the three-dimensional object 35 put on the exposure glass 23. What is different from the first embodiment is that the two light built-in cruciform arms 43a and 43b are used as the photography lighting equipments 40 instead of the light built-in L-shaped arms 41a and 41b.

Figure 13:
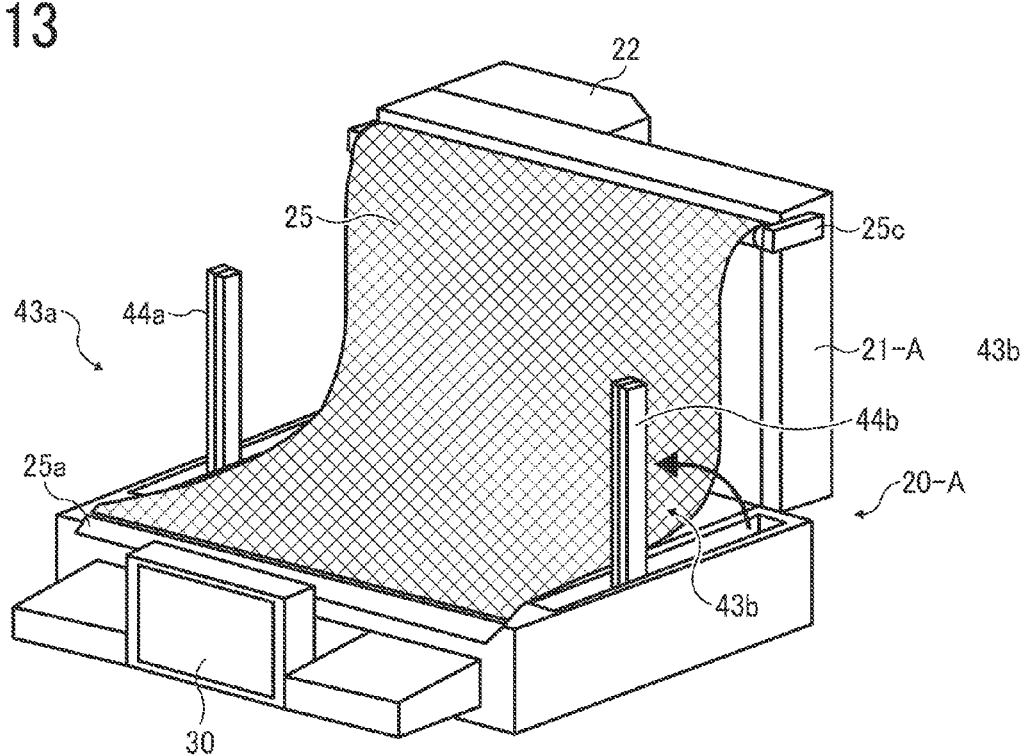
FIG. 13 is a perspective view illustrating the scanner unit after first holders of light built-in cruciform arms are stood after setting of the background paper roll is finished after the state shown in FIG. 10.
Figure 14:
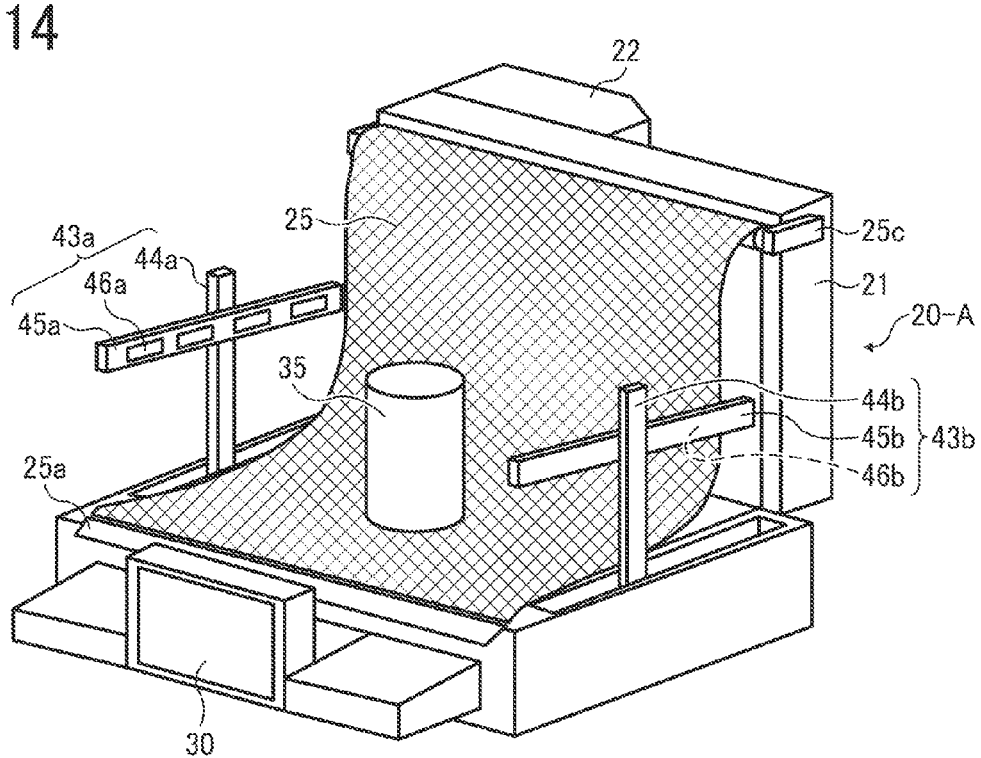
FIG. 14 is a perspective view illustrating the scanner unit after capturing setting is finished after the state shown in FIG. 13.

As illustrated in FIG. 13, after the position of the background paper roll 25 is fixed so that the desired background design and background color screen is positioned in front of the inner face of the scanner cover 21 and over the exposure glass 23, the light built-in cruciform arms 43a and 43b contained in the side faces (third side face 23-3, fourth side face 23-4) of the exposure glass 23 are stood.

Each of the light built-in cruciform arms 43a and 43b includes a first holder 44 whose one end is fixed at the exposure glass 23 side, and the other end that is stood at the position higher than the exposure glass 23, a second holder 45 movably attached to the first holder 44 positioned near the other end of the first holder 44, and light sources 46 provided on at least inner face (exposure glass 23 side face) of the second holder 45.

For example, after the first holders 44a and 44b of the light built-in cruciform arms 43a and 43b are vertically stood, the shaft of the second holders 45a and 45b are rotated, and then the second holder 45a and 45b are fixed while the second holder 45a and 45b are kept in parallel to the exposure glass 23. It is to be noted that it is preferable that the first holders 44a and 44b and the second holders 45a and 45b can be extended and contracted.

Herein, the light sources 46a and 46b can be controlled by the scanner controller 28. The various control, such as, how much the amount of light should be set or which one or more of light sources 46a and 46b should be emitted can be set by using the operational panel 30. As described above, by setting desired positions of the light built-in cruciform arms 43a and 42b and the light sources 46a and 46b and adjusting the amount of light and position of light emission, suitable shooting environment can be set; for example, the three-dimensional object 35 can be captured under in a state in which the shade of the three-dimensional object 35 is controlled at a desired position.

Third Embodiment

Figure 15:
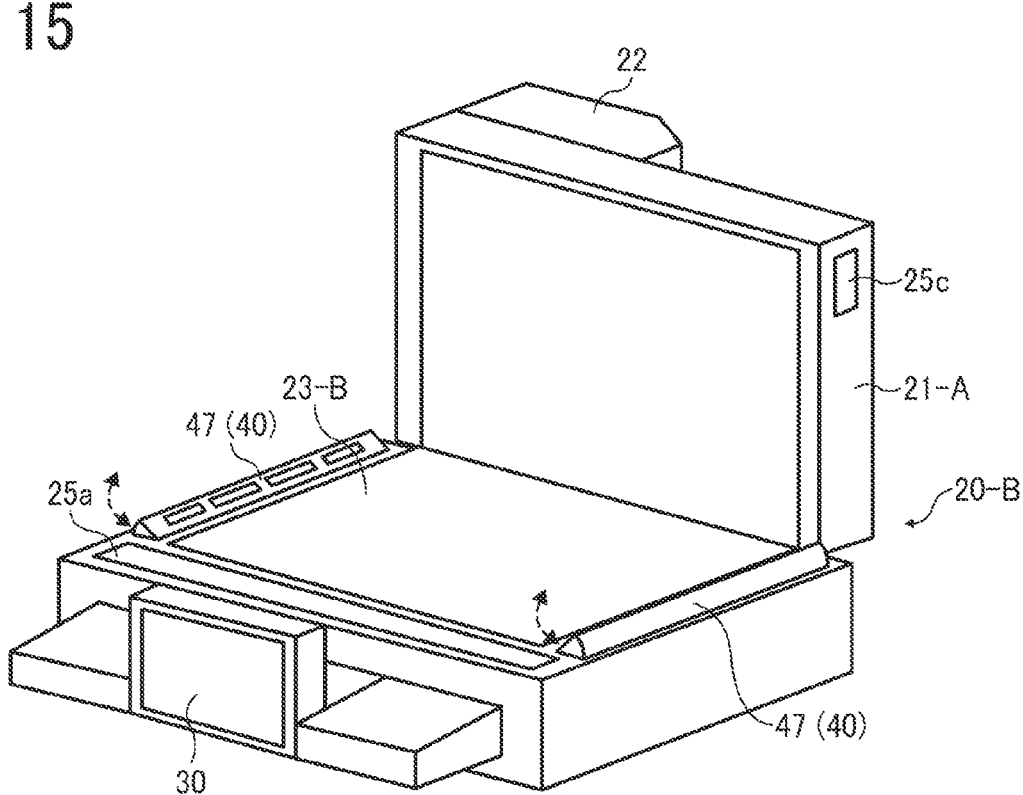
FIG. 15 is a perspective view illustrating a scanner unit including embedded lighting equipments, after capturing setting is finished according to a third embodiment.

It is to be noted that, although the light built-in L-shape arms 41a and 41n and the light built-in cruciform arms 43a and 43b are described as the photography lighting equipments 40, the configuration of the photography lighting equipment 40 is not limited above. For example, embedded type photography lighting equipment whose one end (first side face 43-1 side) of the photo digital direction is set rotatable is used as photography lighting equipment 40 of the third embodiment like that illustrated in FIG. 15.
(Variations)

Yet alternatively, in the light built-in L-shaped arms 41 and 41b, connection point of the L-shaped is constituted by a hinge, and the tip of the L-shape can be rotatable.

In addition, the photography lighting equipment 40 can be only provided at a position where the photography lighting equipment 40 can illuminate the three-dimensional object 35, and the configuration of the photography lighting equipment 40 is not limited to be containable and movable configuration. For example, it is not necessary to provide the photography lighting equipment 40 on both sides (third side face 23-3 and fourth side face 23-4) of the exposure glass 23, the photography lighting equipment 40 can be provided only one side of the exposure glass 23 or the operational panel 30 (second side face 23-2) side. In addition to the photography lighting equipment 40, it is preferable that the camera unit 33 include an emitting device (strobe light).

Herein, although the background paper roll 25 is contained in the scanner cover 21 with the light built-in L-shaped arms 41a and 40b and is contained in the exposure glass 23 side with the light built-in cruciform arms 43a and 43b, alternatively, the background paper roll 25 may be contained in the exposure glass side 23 with the light built-in L-shaped arms 41a and 41b and t is contained in the scanner cover 21 side with the light built-in cruciform arms 43a and 43b.

In addition, although the screen is constituted by a slide-type background paper roll 25 in the above-described embodiments, the configuration of the screen is not limited above; for example, the screen may be formed by an fold-up screen that is contained in the screen container 25b in a folded state and then is used by pulling out.
<Screen>

Figure 16:
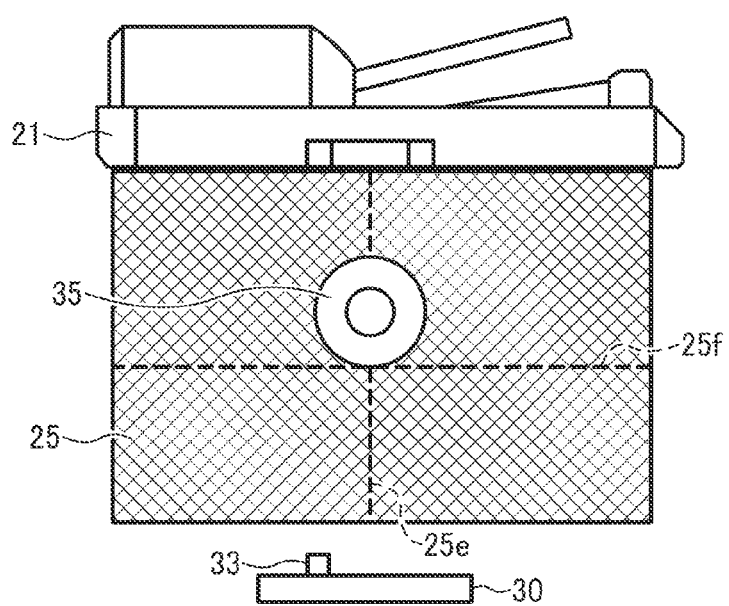
FIG. 16 is a top view illustrating the scanner unit shown in FIG. 4 in a state in which the three-dimensional object is placed on the background paper roll.

FIG. 16 is a top view illustrating the scanner unit 20 in a state in which the three-dimensional object 35 is placed on the background paper roll 25. As illustrate in FIG. 16, it is preferable that reference lines 25e and 25f that indicates arrangement position of the three-dimensional object 35 relative to the camera unit 33 are printed on the respective screens of the background paper roll 25. In the present embodiment, by setting a tip of the three-dimensional object 35 on the crossed point between the reference lines 25e and 25f, positioning the three-dimensional object 35 relative to the camera unit 33 is performed. After the three-dimensional object 35 is put depending on the reference lines 25e and 25f, the user operates the operational panel 30 to activate the photo mode of the camera unit 33.

Figure 17:
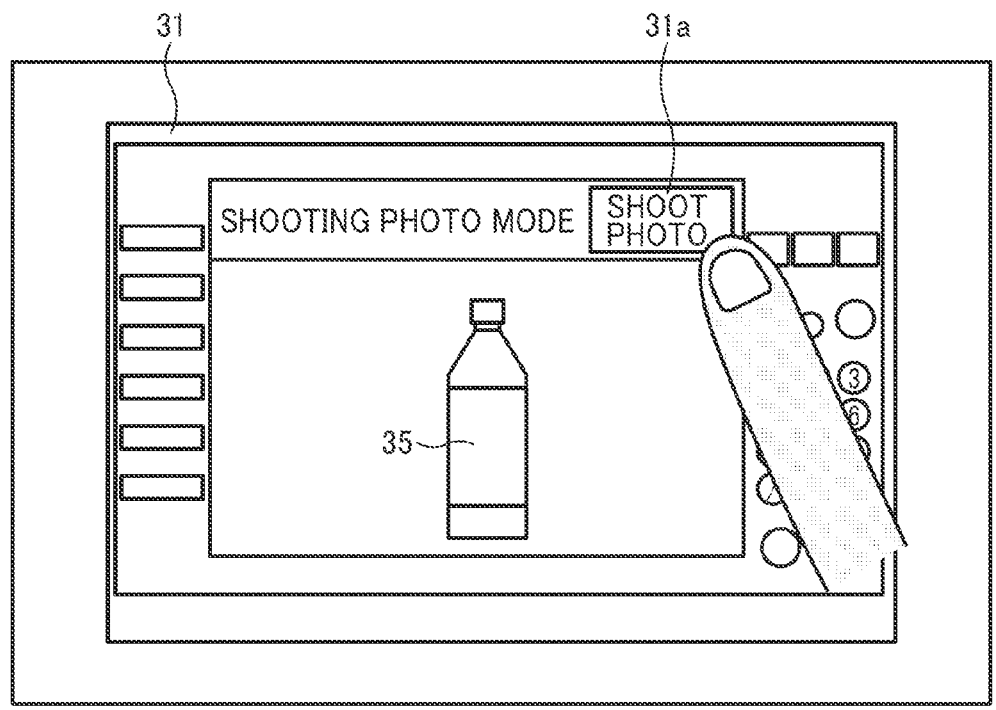
FIG. 17 is one example of a monitor image displayed on an operational panel.

In the photo mode, as illustrated in FIG. 17, the image (monitor image) under monitoring by the camera unit 33 is displayed on the LCD image 31 of the operational panel 30. When the capturing target is fit in the confine of the image, and there is no problem in the monitor image, the user touches the photo icon 31a on the LCD 31, thereby executing shooting process by the camera unit 33 while the three-dimensional object 35 is illuminated by the photography lighting equipment 40, and shooting the three-dimensional object is finished. When positioning of the three-dimensional object 35 is performed depending on the reference lines 25e and 25f, the operational panel controller 34 executes image processing to change scale of the three-dimensional object 35 to transmit to the body controller 3 in the printer unit 10 for outputting a copy.

Figure 18:
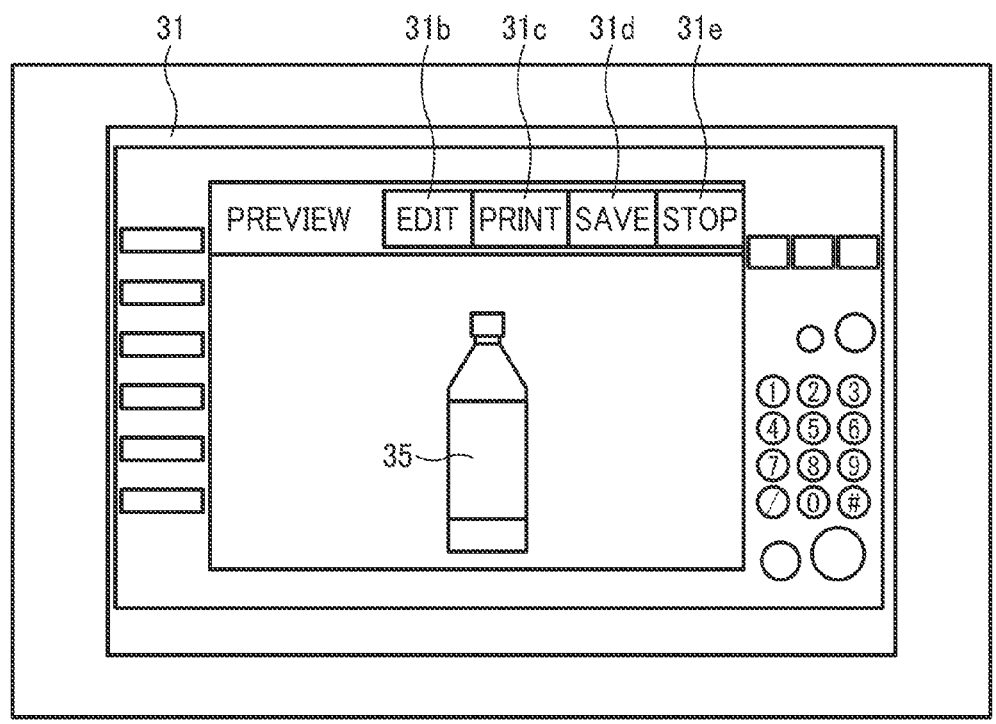
FIG. 18 is one example of a preview image displayed on the operational panel.

After shooting the three-dimensional object 35, as illustrated in FIG. 18, a preview of the captured three-dimensional object 35 is displayed on the LCD 31. The user selects an editing icon 31b, a printing icon 31c, a save icon 31c, and a stop icon 31e, to command respective operation.

Figure 19:
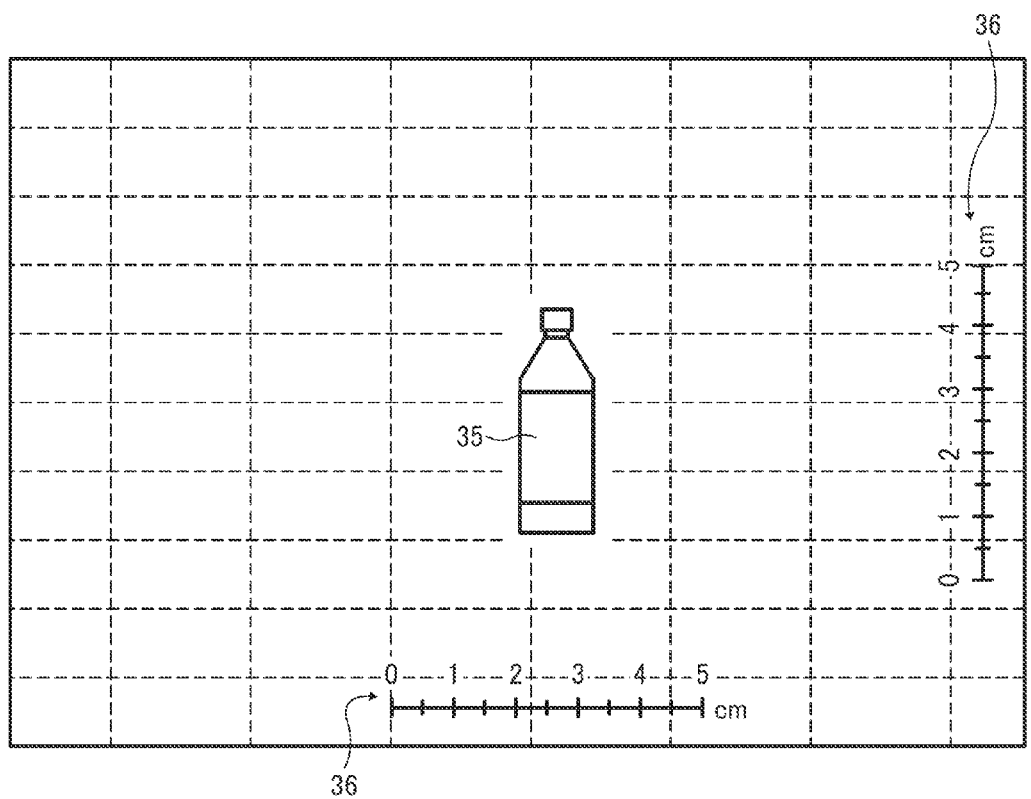
FIG. 19 is one example of an output of a copy on a recording medium when same size printing is performed.

FIG. 19 is one example of a copied output image on a recording medium when same size printing is performed. Herein, in the preview image, by selecting the editing icon 31b, it is preferable that additional information 36 representing an actual scale of the three-dimensional object 35 in the output image or scale grind display can be add.
(Capture-Copy Process)

Figure 20:
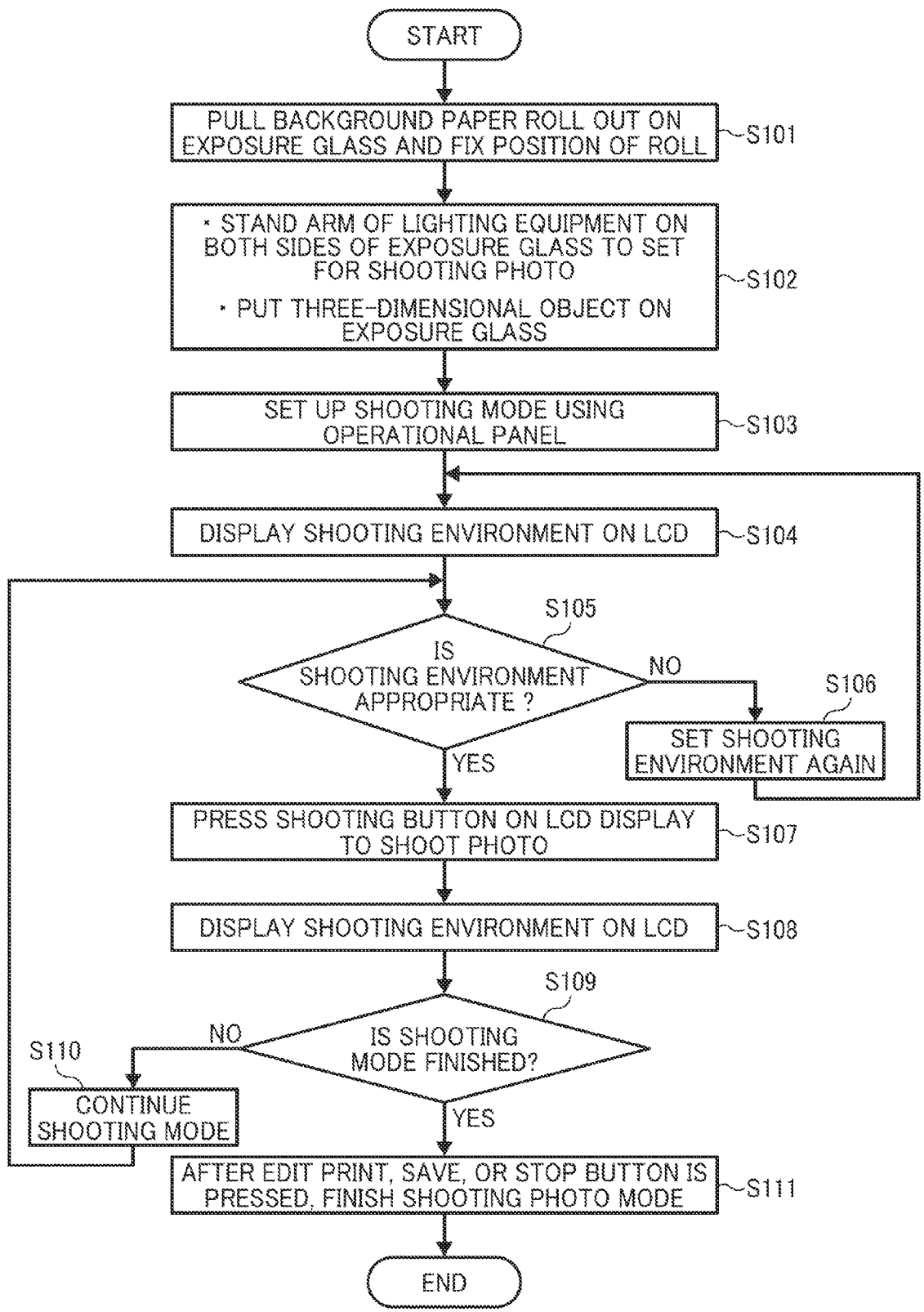
FIG. 20 is a flowchart of the capture-copy process in the scanner unit.

Next, a capture-copy process to capture the three-dimensional object 35 by the scanner unit 20 including the light built-in L-shaped arms 41a and 41b is described below. FIG. 20 is a flowchart of the capture-copy process in the scanner unit 20.

Initially, the user sets up the shooting environment. More specifically, the background paper roll 25 is pulled out from the scanner cover 21, and the pulled out background paper roll 25 is fixed in a state in which the user selected background-design and background color screen to cover the inner face of the scanner cover 21 and the exposure glass 23 at step S101.

Then, the light built-in L-shaped arms 41a and 41b contained in the both sides (third side face 23-3 and fourth side face 23-4) of the exposure glass 23 is pulled up, and then the arm position and lighting position are adjusted, and the lighting environment is set to suit for capturing at step S102.

In these steps, the three-dimensional object 35 is put on the exposure glass 23 via the background paper roll 25. In this state, when the photo mode is activated at step S103, as illustrated in FIG. 17, the LCD 31 of the operational panel 30 displays the photo icon 31a with the three-dimensional object 35 at step S104.

Herein, whether the setting position of the three-dimensional object 35 and lighting environment of the shooting environment are suitable are determined at step S105. When there is a problem in the above-described setting condition for shooting has problem (No at step S105), the shooting environment is set again at step S106. When the shooting environment is suitable (Yes at step S105), by selecting the photo icon 31a, the shutter of the camera unit 33 is clicked and captured at step S107.

After shooting photo, a preview image (FIG. 18) is displayed on the operational panel 30 at step S108. When the user confirms the preview image and the photo mode is finished without any problem (Yes at S109), the user touches any one of the editing icon 31b, the printing icon 31c, the save icon 31c, and the stop icon 31e to execute the desired editing, printing, saving, and stopping operation to acquire the desired output result of the three-dimensional object 35 at step S110.

When the shooting process is revisited again (No at step S109), the photo mode is continued (S110), and process gets back to determination process of whether the shooting environment is suitable.

It is to be noted that, the determination of the shooting environment (step S105) is performed while the user confirms the display 31, for example, when the three-dimensional object 35 could not be fit inside the screen 25, the operational panel controller 34 reports the alert on the operational panel 30. As described above, by reporting the position failure to the user via the operational panel 30, the user resets the three-dimensional object 35 at the correct position, even through the three-dimensional object 35 falls from a shooting-enable range when the three-dimensional object 35 is captured at the first time, the user can acquire the desired copying result with a simple operation.

As described above, in the image processing device 1 according to the present embodiment, by providing the light built-in arms 41 or 43 installing the light sources 46 in the vicinity of the exposure glass 23 (e.g., both sides (side faces 23-3 and 23-4) of the exposure glass 23), the three-dimensional object 35 can be captured in a state in which the three-dimensional object 35 is uniformly illuminated to prevent the illumination fluctuation. In addition, by providing the reel type background paper roll 25 on the scanner cover 21 side or the exposure glass side 23, the suitable background screen can be selected from the multiple background design and color screens to prevent generation of the shape of the three-dimensional object 35, and then the background screen is fixed. Thus, the user can shoot the three-dimensional object 35 with a simple operation under a suitable lighting environment in which there is no illumination fluctuation and no shades.

Accordingly, in the comparative example, in order to prevent the illumination fluctuation of the object and illuminate evenly, using PC and the complicated capture dedicated system are required, and burden on the user during setting and operation is great. Conversely, in the present disclosure, user can acquire output of copy of the three-dimensional object under the suitable lighting environment in the image processing system 1.

Furthermore, the background paper roll 25 that is slidably pulled out on the exposure glass 23 has a configuration of the color and the design can be selectable. Accordingly, the user can make the desired shooting environment in which the desired background design or/and background color is selected not to generate the illumination fluctuation and the shade.

As described above, using a basic configuration in which the image processing device 1 that can copy the two-dimensional object at the same size, and adding a few components, the copied image of the three-dimensional object 35 can be output with a simple configuration and high quality.

With this configuration, operability and convenience of shooting process can be improved without limitation, compared to the comparative example image processing device in which the reading operation when the three-dimensional object is read is complicated or the special shooting environment is required.

In addition, since photography lighting equipment 40 and the background paper roll 25 can be housed in the image processing device 1, in the usual copying when the three-dimensional object 35 is not targeted as the copying output, the photography lighting equipment 40 and the background paper roll 25 do not disturb the scanning operation of the two-dimensional document, thereby maintaining the operability in the image process apparatus 1 of the present disclosure, similar to the comparative-example image processing device.

In addition, when the copying result is output, the user can confirm the preview image of the three-dimensional object 35 shown in the LCD 31 of the operational panel 30, the output failure can be reduced and the shooting again can be reduced, therefore, convenience for the user can be improved.

Numerous additional modifications and variations are possible in light of the above teachings. It is therefore to be understood that, within the scope of the appended claims, the disclosure of this patent specification may be practiced otherwise than as specifically described herein.

What is claimed is:

1. An image processing apparatus comprising:
an exposure glass on which an original is to be placed;
a scanner cover to openably cover the exposure glass from above, wherein a tip of the scanner cover is lifted around a first side face of the exposure glass to open the exposure glass;
a document scanner to read a two-dimensional object of the original on the exposure glass and output read image data;
a camera unit, disposed near a second side face positioned opposite to the first side face of the exposure glass, to capture an image of a three-dimensional object of the original on the exposure glass and output captured image data;
photography lighting equipment comprising a movable light source unit, movable from a first position at or below the exposure glass to a second position above the exposure glass, to illuminate the three-dimensional object put on the exposure glass when the camera unit captures the image of the three-dimensional object;
an image forming unit configured to convert the read image data and the captured image data into form a printed image on a recording medium; and
a setting controller configured to control a reading process in the document scanner, a capturing process in the camera unit, and an image forming process in the image forming unit, wherein the photography lighting equipment further comprises:
a first holder having a first end held located at a predetermined position near the exposure glass and a second end held located at a higher position than the exposure glass; and
a second holder held in the second end of the first holder, movable independently of the first holder,
wherein the light source unit attached to the second holder.

2. The image processing apparatus according to claim 1, further comprising a lighting-equipment container, recessed in the document scanner at a position adjacent to the exposure glass that houses the photography lighting equipment when the photography lighting equipment is not in use,
wherein the photography lighting equipment is dimensioned so that the height of the photography lighting equipment when housed in the lighting-equipment container does not exceed the height of the exposure glass.

3. The image processing apparatus according to claim 1, wherein one end of the photography lighting equipment is fixed at a predetermined position adjacent the exposure glass, and the other end of the photography lighting equipment is positioned above the exposure glass, and the photography lighting equipment comprises the light source unit to emit light and the position of the light source unit is movable in the photography lighting equipment positioned higher than the exposure glass.

4. The image processing apparatus according to claim 1, further comprising a background screen used as a background when the image of the three-dimensional object is captured,
wherein, when the scanner cover is opened, the background screen is positioned between an upper tip of the scanner cover and the second side face of the exposure glass, passing through the vicinity of a rotary shaft of the scanner cover.

5. The image processing apparatus according to claim 4, the background screen comprises a background paper roll provided containable in the upper tip of the scanner cover, and the background paper roll comprises continuously connected multiple backgrounds designs or multiple background colors.

6. The image processing apparatus according to claim 4, the background screen comprises a background paper roll provided containable in the second side face of the exposure glass of the image forming unit side, and the background paper roll comprises continuously connected multiple backgrounds designs or multiple background colors.

7. The image processing apparatus according to claim 1, wherein at least two photography lighting equipments are provided adjacent a third side face and a fourth side face opposite side of the third side face, positioned on outer sides of the exposure glass in a direction in which the scanner cover is lifted.

8. The image processing apparatus according to claim 1, wherein the camera unit is pivotably provided adjacent the second side face of the exposure glass so that an end face of the camera unit, positioned the rotary shaft side of the scanner cover when the camera unit is not in use, is stood up when the camera unit is in use, and the camera unit is positioned facing to an inner side of the scanner cover when the camera unit is stood.

9. The image processing apparatus according to claim 1, wherein the camera unit comprises a display to represent the image information containing a monitor image data of the three-dimensional object and the captured image data.

10. An image processing method executed by an image processing apparatus that includes an exposure glass, a scanner cover, a document scanner, a camera unit, and a photography lighting equipment,
the method comprising the steps of:
opening the scanner cover lifted to open the exposure glass;
putting a three-dimensional object of the original on the exposure glass;
illuminating the three-dimensional object put on the exposure glass by moving the photography lighting equipment from a first position even with or below the exposure glass to a second position above the exposure glass;
controlling a shooting environment;
capturing an image of the three-dimensional object on the exposure glass; and
converting captured image data to form a printed image on a recording medium to output a copy, wherein the photography lighting equipment further comprises:
a first holder having a first end held located at a predetermined position near the exposure glass and a second end held located at a higher position than the exposure glass; and
a second holder held in the second end of the first holder, movable independently of the first holder,
wherein the light source unit is attached to the second holder.

* * * * *